April 15, 1952 W. E. JOOR, JR 2,593,153

STORAGE TANK

Filed June 7, 1946 10 Sheets-Sheet 1

INVENTOR.
WILLIAM E. JOOR JR.
BY Frederick H. Untiedt
ATTORNEY

April 15, 1952 W. E. JOOR, JR 2,593,153
STORAGE TANK
Filed June 7, 1946 10 Sheets-Sheet 2

INVENTOR.
WILLIAM E. JOOR JR.
BY Frederick H. Untiedt
ATTORNEY

STORAGE TANK

INVENTOR.
WILLIAM E. JOOR JR.
BY [signature]
ATTORNEY

STORAGE TANK

Filed June 7, 1946

INVENTOR.
WILLIAM E. JOOR JR.
BY Frederick H. Untiedt
ATTORNEY

INVENTOR.
WILLIAM E. JOOR JR.
BY Frederick H. [illegible]
ATTORNEY

INVENTOR.
WILLIAM E. JOOR JR.
BY Frederick H. [signature]
ATTORNEY

INVENTOR.
WILLIAM E. JOOR JR.
BY Frederick H. Whitehead
ATTORNEY

INVENTOR.
WILLIAM E. JOOR JR.
BY Frederick H. Hustead
ATTORNEY

STORAGE TANK

Filed June 7, 1946 10 Sheets-Sheet 9

INVENTOR.
WILLIAM E. JOOR JR.
BY Frederick H. [signature]
ATTORNEY

INVENTOR.
WILLIAM E. JOOR JR.
BY Frederick H. Untiedt
ATTORNEY

Patented Apr. 15, 1952 2,593,153

UNITED STATES PATENT OFFICE 2,593,153

STORAGE TANK

William Eugene Joor, Jr., Washington, D. C.

Application June 7, 1946, Serial No. 675,105

8 Claims. (Cl. 220—1)

The present invention relates to storage tanks and more particularly to tanks for storing large volumes of volatile liquids.

Tanks of the type intended for the storage of gasoline and other volatile hydrocarbons are subjected not only to hydrostatic pressures but vapor pressures as well. It is desirable that the liquid be stored under its own vapor pressure and that there be no substantial loss due to evaporation and venting of the vapor. The vapor pressure of most volatile liquids increases with rise in temperature. Some liquids have boiling points below normal temperatures. Vapor losses may be minimized by utilizing a storage vessel of sufficient strength to withstand the internal vapor pressure of the liquid under varying temperature conditions. In a fully closed storage vessel only a sufficient amount of liquid is vaporized to create the vapor pressure corresponding to the temperture of the surface of the liquid in the vessel, and, if this vapor is confined, it will exert such pressure on the surface of the liquid as to prevent further evaporation.

There may be some losses called breathing losses, if the temperature changes from a relatively hot temperature to a relatively cold temperature and then back to a hot temperature; the vapor pressures at the hot temperature may be greater than the design pressure of the tank, requiring that a small portion of the vapors be vented through a pressure relief valve. As the vapors remaining in the tank are cooled, they condense, and it is possible that a partial vacuum may be created in the tank. Under such conditions the safety valve is designed to let air into the tank to relieve the vacuum. Then as the temperature increases again, additional vapor and a part of the air are expelled through the safety valve, if the vapor pressure exceeds the pressure setting of the safety valve. Sometimes losses occur when the tank is being filled, as a portion of the vaporized material will be expelled through the safety valve with the air which was in the tank before filling began.

Pressure storage tanks are usually designed to withstand internal pressures which will minimize the vapor losses. The choice of these design pressures is based upon the type of liquid to be stored, the vapor pressure of the liquid at the anticipated maximum and minimum surface temperatures, and the maximum and minimum temperatures of the vapor space above the liquid. The design pressures may vary from a few ounces per square inch to as much as 30 or 40 pounds per square inch. The volume of such tanks may vary from five or ten thousand barrels to one or more hundred thousand barrels.

It is the primary object of the present invention to construct a storage tank for volatile liquids that will satisfy all loading conditions.

It is another object of the invention to provide a storage vessel having a substantially flat bottom and to provide weighted means at the juncture of the side walls with the bottom to restrain upward movement of the lower portions of the side walls as the liquid within the vessel is withdrawn.

It is a further object of the invention to provide a vessel having curved side walls and means to restrain inward movement of the side walls upon decrease of the hydrostatic pressures against said side walls, thus preventing excessive compressive stresses within the wall plates and possible buckling thereof.

It is still another object of the invention to provide a roof structure designed not only fully to support the roof loading but also to counteract compressive stresses in the side wall plates.

Another object of the invention is to utilize the advantages of the spheroid type of storage vessel and so to reinforce the walls of the vessel that liquids may be stored safely and economically therein.

A still further object of the invention is to utilize the principle of the spheroid type of tank in a modified form thereof in which a weighted center column is employed, the column acting to support the roof and, at the same time, anchor the roof structure to restrain the same against vertical lift. This form of tank permits the use of relatively low roofs but is adapted to accommodate large volumes of liquids.

Other objects will be apparent from the following description of preferred embodiments of the invention taken in connection with the accompanying drawings, in which.

Figure 37:
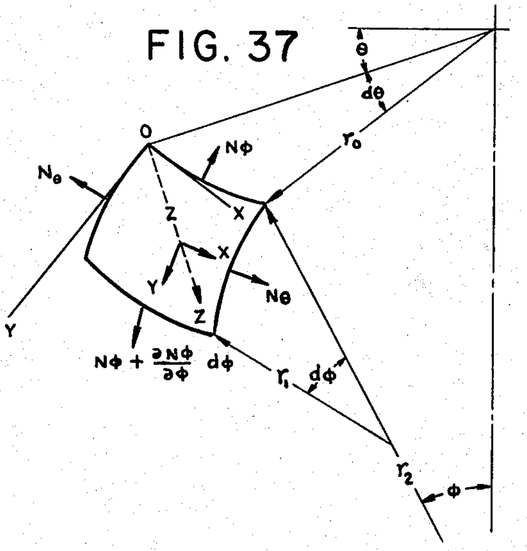
Figure 38:
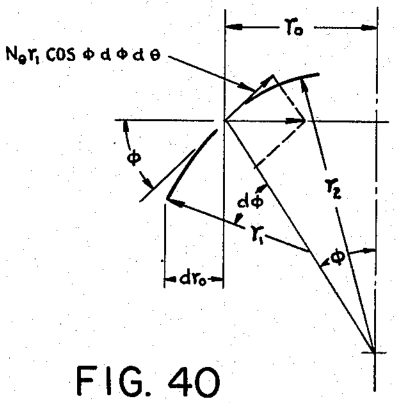
Figures 39, 40:
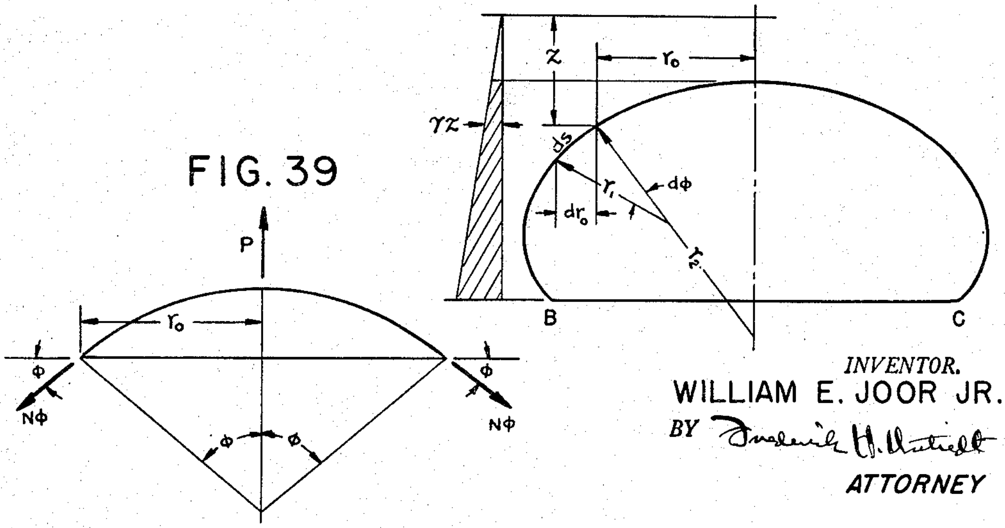

Figs. 37, 38, and 39 are diagrams illustrating the determination of stresses in a segment of a spheroid shell of the type employed in the present invention; and Fig. 40 is a diagram illustrating the determination of stresses in a spheroid shell and the sectional shape of the ideal spheroid.

Figure 1:
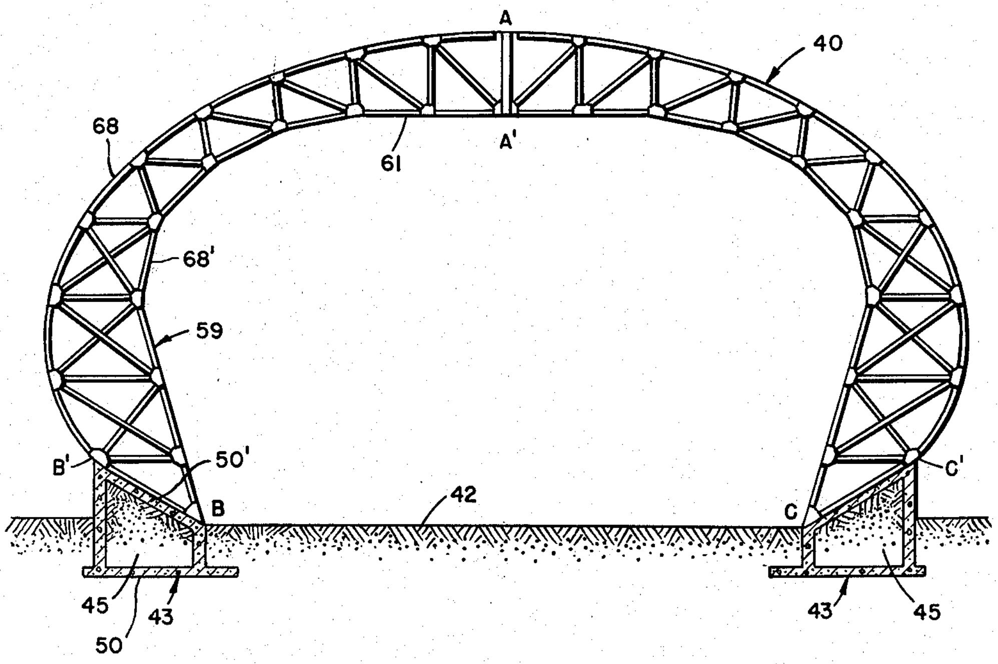
Fig. 1 is a vertical section through the center of a tank illustrating one form of the invention.

In order to understand the factors involved in providing storage facilities for large volumes of liquid stored under relatively low pressures, consider a container shaped as in Fig. 40, the material of which the container is made being elastic, and assume that there are no restraining structures as shown in Fig. 1. If the vessel is nearly full of a liquid of a specific density and the liquid has a specific vapor pressure at a certain temperature, the shape the vessel would take would be substantially like that shown in Fig. 40. Such a shape is generally known as a spheroid. However, if such a vessel contained only a small volume of liquid, and the remainder of its volume were filled by vapors at the specific vapor pressure, the vessel would assume a shape more nearly like a sphere, provided the weight of the elastic materials composing the walls were negligible. The stresses in the material composing the walls would be the same in any direction under the fully loaded condition.

The above observations are made on the assumption that the material composing the walls is quite elastic. In practice no materials of this type have been found which can economically store such large volumes of liquids. Therefore, the walls of most tanks of this type have been built of steel plates, which are not as elastic as the material of the hypothetical tank described above. Although steel is elastic, a vessel made of steel could not go through such extreme changes in shape without causing some portions of the walls to be stressed beyond the elastic limit of the steel. Thus, as the shape is changed from that shown in Fig. 40 to a shape almost spherical, the outer walls would be forced to contract and the roof to stretch. This would place compressive stresses in the steel outer walls and tensile stresses in the roof, which stresses would quickly exceed the design stresses for the material, assuming that the walls, roof, and bottom of the vessel were shaped as shown in Fig. 40.

The shape of the vessel shown in Fig. 40 may be called the ideal spheroid. When full of liquid under its vapor pressure the ideal spheroid requires no restraining structures to keep the wall, roof and bottom plates in its ideal shape, and such a spheroid designed only for the fully loaded condition requires a minimum of materials for the walls, roof and bottom. However, were such a tank emptied, the stresses would change in the process of removing the liquid and cause failure of the vessel.

Attempts have been made to build pressure storage tanks based on the foregoing principles, but most of them have been modifications of the ideal spheroid. Some have bottom plates which are dished, and the wall and roof plates are made to a shape which is a compromise between the ideal spheroid and a sphere. Others have been built in which the ideal spheroid shape is approximated by using structural members to restrain the roof and bottom plates from assuming a spherical shape when the vessel is empty of liquid but contains a vapor under pressure. In the latter type segments of the roof and bottom are dished, and the restraining structural members are secured to the roof or the bottom at the juncture line of adjoining segments. This type is known as the noded spheroid. No satisfactory means have as yet been developed whereby the shape of the ideal spheroid may be used to satisfy all loading conditions.

In order to understand the principles upon which the present invention is based, reference is made to the Membrane Theory in which two basic equations for determining the stresses in the shell have been developed. In Figs. 37 and 38, there is represented a small segment of an ideal spheroid. The ideal spheroid, the sphere and other modified spheroids are all shells that have the form of surfaces of revolution. A surface of revolution is obtained by rotation of a plane curve about an axis lying in the plane of the curve. This curve is called the meridian, and its plane is a meridian plane. An element of a shell is cut out by two adjacent meridians and two parallel circles, the center of the circles lying in the axis of revolution, the axis of revolution being perpendicular to the plane of each circle, as shown in Fig. 37. The position of a meridian is defined by an angle $\theta$, measured from some datum meridian plane; and the position of a parallel circle is defined by the angle $\phi$, made by the normal to the surface and the axis of rotation. The meridian plane and the plane perpendicular to the meridian are the planes of principal curvature at a point of a surface of revolution, and the corresponding radii of curvature are denoted by $r_1$ and $r_2$, respectively. The radius of the parallel circle is denoted by $r_0$, so that the length of the sides of the elements meeting at O, as shown in Fig. 37, are $r_1 d\phi$ and $r_0 d\theta$. It will been seen that $r_0 d\theta = r_2 \sin \phi d\theta$. The surface area of the element is then $r_1 d\phi r_2 \sin \phi d\theta$. The magnitude of the normal forces in the shell per unit length are denoted by $N\phi$ and $N\theta$. The intensity of the external load, which acts in the meridian plane, in the case of symmetry, is resolved in two components $y$ and $z$ parallel to the coordinate axes.

Without following the mathematical derivation, the two equations used in the determination of the stresses in a thin plate based upon the membrane theory are given hereinafter.

Instead of the equilibrium of an element, the equilibrium of the portion of the shell above the parallel circle defined by the angle $\phi$ may be considered, as shown in Fig. 39. If the resultant total load on that portion of the shell is denoted by P, the equation of equilibrium is $$2\pi r_0 N\phi \sin \phi = P \qquad (1)$$

The second equation may be written $$\frac{N\phi}{r_1} + \frac{N\theta}{r_2} = yz \qquad (2)$$

in which $y$ represents the density of the fluid contained in the vessel and $z$ the equivalent depth; $yz$, therefore represents the internal pressure and corresponds to the value $z$ in Fig. 40.

In an ideal spheroid, fully loaded, the shape of the meridian is such that the internal pressure equal to $yz$ will give rise at all points of the shell to forces $$N\phi = N\theta = \text{constant}$$

and Equation 2 may be written $$N\phi\left[\frac{1}{r_1} + \frac{1}{r_2}\right] = yz \qquad (3)$$

The equations may be used to set up differential equations which may be integrated numerically to secure the shape of the curve in the meridian plane.

For conditions of loading other than the fully loaded condition Equations 1 and 2 may be used to determine the stresses at any point in the shell.

Thus, it is possible to determine the stresses in the shell shown in Fig. 40 for various loading conditions. The stress $N\theta$ is a tensile stress acting in a circumferential direction and is resisted by the tensile strength of the shell plates immediately above the points B and C. The stress $N\phi$ is a tensile stress acting in a meridian plane at the points B and C in a direction tangential to the curvature of the shell at these points. Therefore, the stress $N\phi$ acts to lift the juncture of line of wall and bottom plates when any loading condition other than the fully loaded condition exists within the tank. This stress $N\phi$ can be resolved into its vertical and horizontal components. The horizontal component may be resisted by tensile stresses in the bottom of the tank. However, to resist the vertical components, the present invention contemplates securing the juncture line to a foundation. These stresses at times may be very great, requiring a corresponding great reaction to balance the vertical component. This would require a massive foundation. Therefore, there has been provided the structure 43 shown in Fig. 1, and in greater detail in Fig. 28, in which the reinforcing rods 44 in the concrete foundation project from the foundation and are secured to the shell or walls of the tank 40 at or near the break line B′—C′ of the wall plates 41 and at the juncture line B—C by welding.

The foundation, of course, must extend around the periphery of the tank just below the juncture line. Such an arrangement secures the juncture line in place for all conditions of loading and, since the full value of the vertical component of $N\phi$ is resisted by the foundation, there will be no stresses in the bottom plates in any plane other than the horizontal plane. Therefore, there would be no necessity to dish or curve the bottom plates 42 in this vessel 40.

In an ideal spheroid the bottom plates are joined to the side wall plates at B—C, Fig. 40. The parameters of the design fix the shape of the vessel above the points B—C to an exact value. This is also true of the modified spheroids shown in Figs. 1 and 6. Therefore, the depth of the tank above the points B—C is determined once and for all by these parameters. However, in providing the type of foundation described above, it is possible to extend the side wall plates below the break line B′—C′ to the juncture B—C indicated in the drawings. The extended plates 57 must be supported by the foundation to withstand the forces acting upon them and therefore rest flush on the upper face of the foundation. By such extension an increase in the effective depth and therefore increase in the volume of the tank at the expense of very little additional material is obtained.

Figures 29, 30, 31:
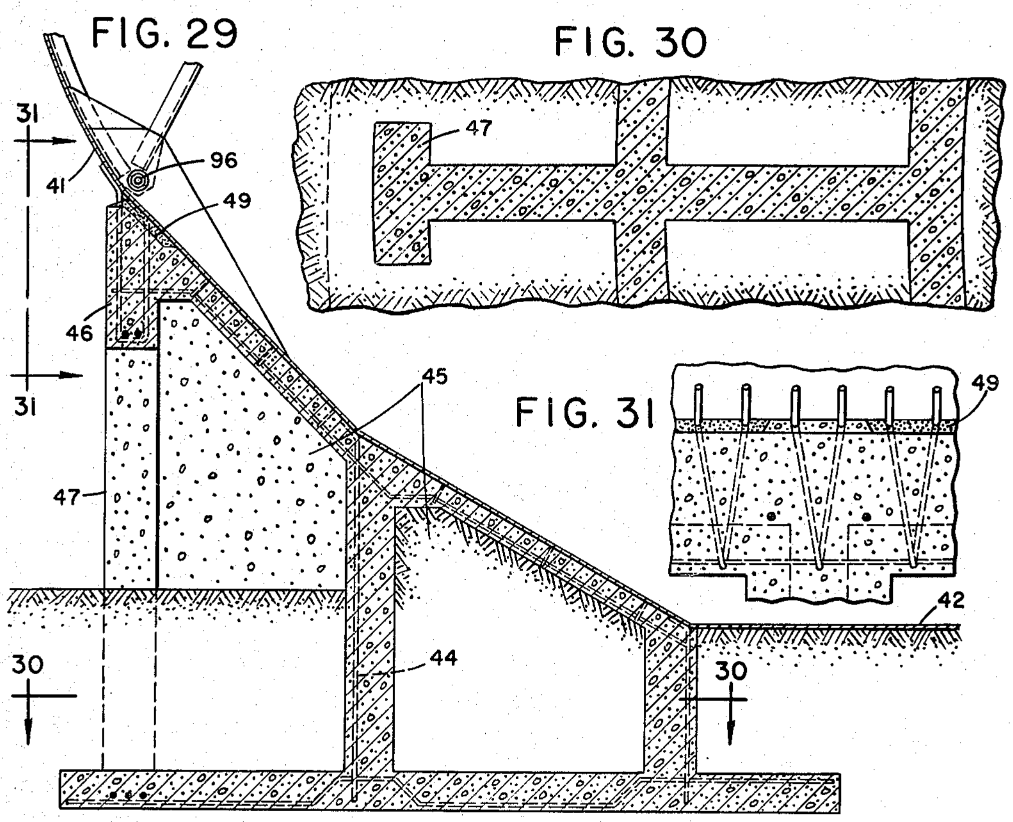
Fig. 29 is an enlarged fragmentary vertical section through a modified form of base of the type shown in Fig. 6.
Fig. 30 is a section taken on line 30—30 of Fig. 29.
Fig. 31 is a section taken on line 31—31 of Fig. 29.

In effect the side wall plates and the foundation act somewhat as a dam in a reservoir, the height of which may be increased until an economic balance of the cost of materials involved is reached. The dimensions may become large enough to provide the required mash, but it is preferred to provide the foundation with cells 45, the latter being then filled with crushed stone or the like. In fact, the outer wall may be replaced by a beam 46 below the points B′—C′ supported by columns 47 with the cells open to the outside of the foundation. This type of structure may be used for relatively large foundations, as shown in Fig. 29, in which the top face of the foundation is broken to form two inclined surfaces, the outermost surface being inclined at a greater angle than the inner portion of the face.

Foundations of the type described above secure the juncture line B—C between the side wall plates and the bottom plates and the "break line" B′—C′ in the side wall plates for all conditions of loading, and, since the full value of the vertical component of the stress $N\phi$ is resisted by the foundation, there will be no stresses in the bottom plates other than a portion of the horizontal components of $N\phi$ which act in the plane of the bottom plates. Therefore, there is no necessity to dish or curve the bottom plates to restrain a portion or all of the vertical components of the stress $N\phi$.

Figure 32:
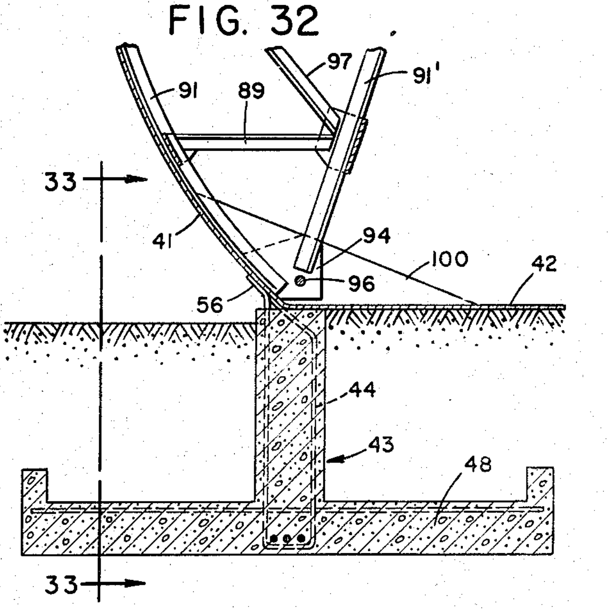
Fig. 32 is an enlarged fragmentary vertical section through another form of base employed in any of the tanks referred to hereinafter.
Figure 33:
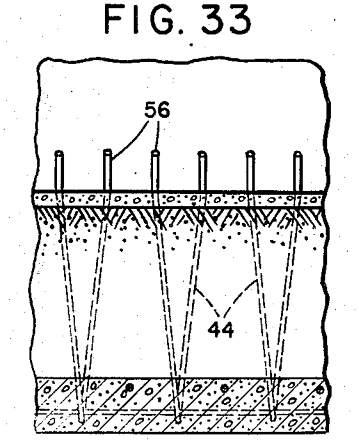
Fig. 33 is a section taken on line 33—33 of Fig. 32.

As another modification there may be employed a foundation having a cross-section shaped as an inverted T, as shown in Fig. 32, soil or rock being filled in above the horizontally extended cross arms 48 of the T so that a great mass would be available to resist the upward pull exerted through the reinforcing bars by the vertical component of $N\phi$. Such an inverted T cross-section with the weight of the fill above it is more economical of concrete than a rectangular cross-section of equivalent weight. The reinforcing rods 44 in the vertical stem of the T are extended and welded to the side wall plates 41 at their juncture line with the bottom plates B—C and thereafter soil is filled in above the cross arms 48 of the T to supply the required mass. This form of foundation may also be used advantageously with the other types of tanks described herein.

Figures 22, 23:
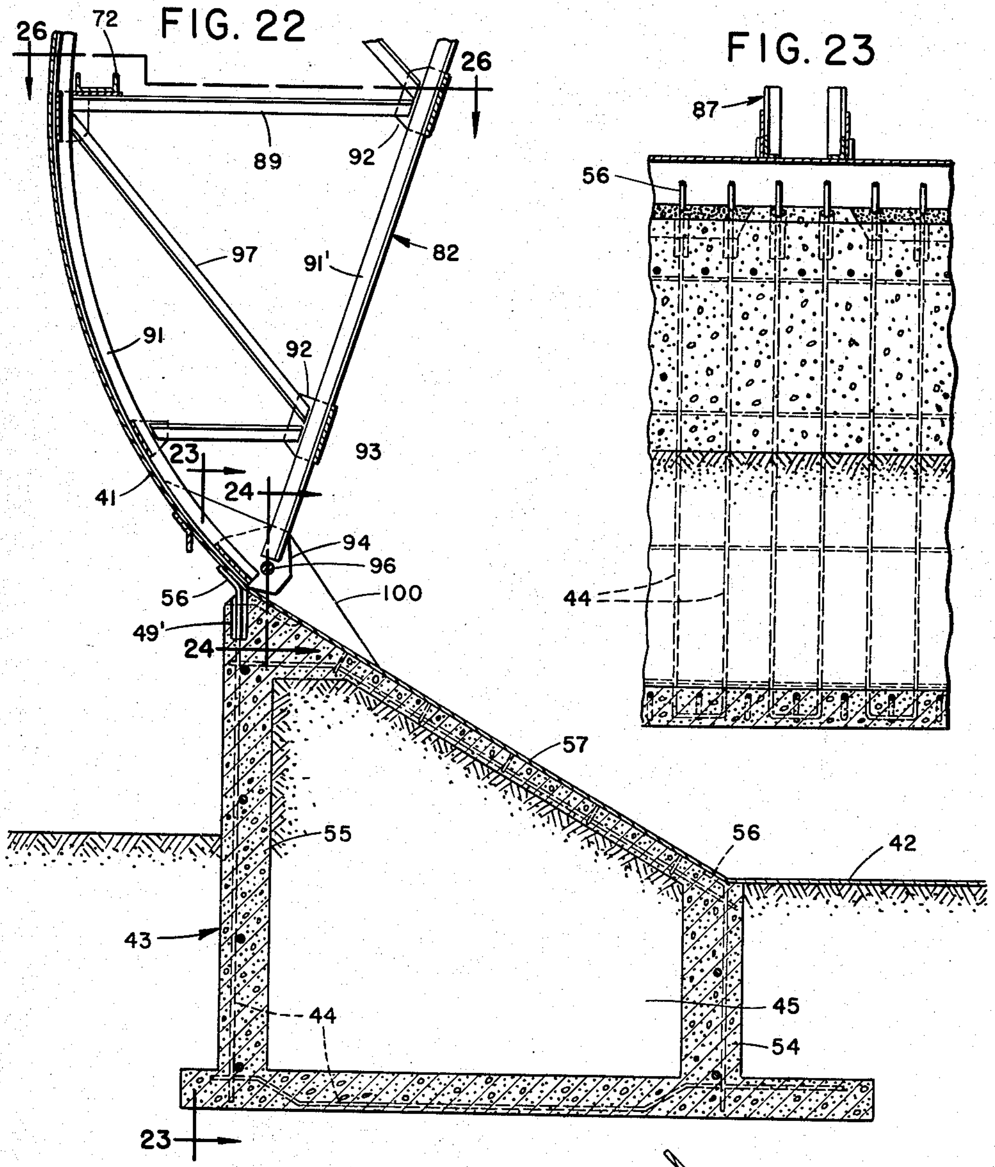
Fig. 22 is an enlarged fragmentary vertical section illustrating the weighted circumferential base and the connections between the base and the arch of the structure shown in Fig. 6.
Fig. 23 is a section taken on line 23—23 of Fig. 22.
Figure 25:
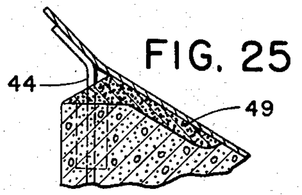
Fig. 25 is a fragmentary section taken on line 25—25 of Fig. 24.
Figure 24:
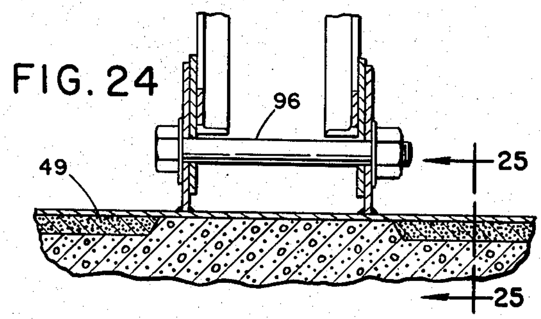
Fig. 24 is a section taken on line 24—24 of Fig. 22.

As the loading conditions within the vessel changes from no load to the fully loaded condition, the side wall plates are stressed to their design limits. Under such conditions each elemental section in the plate is increased in size by an amount proportional to the value of the stress. This increase in size results in a slightly enlarged circumference and radius, $r_o$ for the vessel. At the "break line" B′—C′, the side walls are secured to a rigid foundation, and these side walls at this point cannot increase in radius. A short distance above the "break line," the plates do increase in radius. This results in bending in the side wall plates between the "break line" and the point above. This bending may cause excessive stresses in these plates. To avoid the possibility of overstressing these plates as described, there is provided a sand pocket 49, as shown in Fig. 25, between the side wall plates extended below the "break line" B′—C′ and the foundation, and the reinforcing rods are extended above the concrete a sufficient length so that the "break line" B′—C′ may increase in radius, $r_o$ as the stress in the side wall plates increases. The bending then takes place in the extended portions of the rods and in that part of the plate below the "break line" which lies above the sand pocket. These may be understressed to withstand the bending. Shield cups 49′, as shown in Figs. 22 and 28, may also be provided to permit distortion of the rods.

Even though the juncture line of the wall and bottom plates is secured to the foundation as described hereinbefore, there is the tendency for the remainder of the shell to assume a spherical shape when the vessel contains less than its full liquid load plus its vapor pressure. This tendency would cause the curved portion of the walls which extend outward beyond the foundation to move inward as the roof moves upward to assume the spherical shape. Such forces acting on the roof and walls result in compressive stresses in the outer portions of the walls. If these walls are restrained from moving inward, the compressive stresses will not become excessive and failure of the vessel will be obviated.

Figures 26, 27, 28:
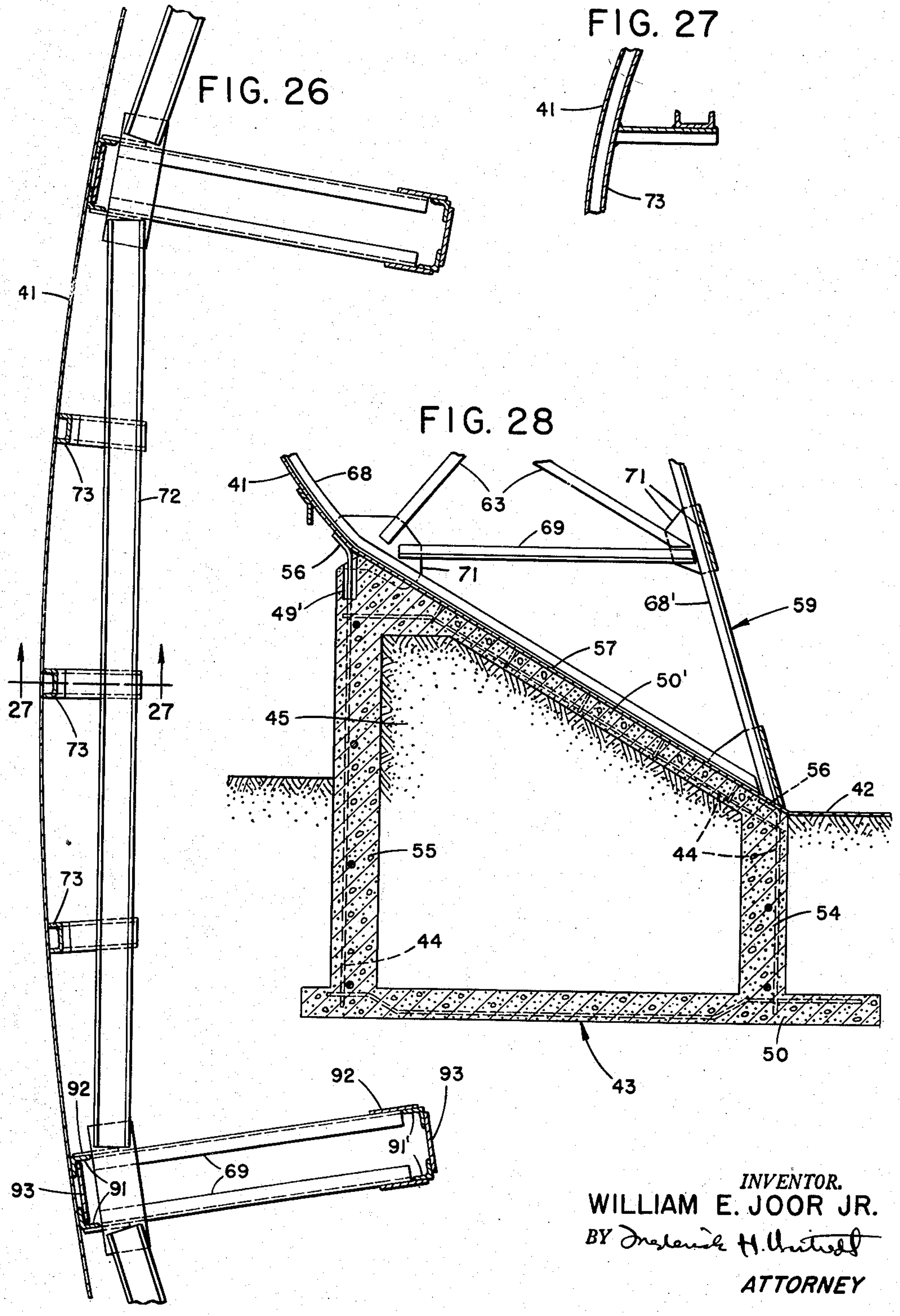
Fig. 26 is a section taken on line 26—26 of Fig. 22.
Fig. 27 is a section taken on line 27—27 of Fig. 26.
Fig. 28 is an enlarged fragmentary vertical section illustrating the weighted circumferential base and the connections between the base and the arch of the structures shown in Figs. 1 and 3.

Referring more particularly to Figs. 1 and 28, which illustrate the invention in its simplest form, it will be seen that the walls and roof of the tank 40 constitute a vessel having the general characteristics of the ideal spheroid, previously referred to herein, and that the lower portion of the tank is secured to the foundation 43. The walls of the tank are formed by welding together a series of segmental metal plates 51 and substantially rectangular plates 52, each curved vertically and horizontally in accordance with the formula for the ideal spheroid discussed herein. The foundation 43 extends circumferentially about the entire perimeter of the base of the tank and, although it may be in the form of a solid mass of concrete, preferably, as shown in Fig. 28, it consists of a hollow reinforced concrete cellular structure generally trapezoidal in cross-section, and provided with the cells 45. The base 50 of the foundation extends radially within and beyond the inner and outer vertical walls 54, 55 and is embedded in the earth some distance below the bottom of the tank. The space within the walls is filled with earth, gravel, loose rocks, or the like so that the entire base is weighted to resist any upward pull by the tank, the lower side walls of which are attached to the foundation. It will be noted that the base 50, top 50′, and vertical walls 54, 55 of the foundation are reinforced with the steel rods 44 and that the upper ends of the vertical rods are bent, as at 56, to lie flush against the side plate 41 and inclined plate 57 just above the break line and juncture line respectively. Plate 57 lies contiguous to the top wall 50′ of the foundation, this top wall being inclined downwardly toward the center of the tank. The bent portions of these rods are welded to the plates. These rods are U-shaped and spaced a few inches apart, as shown in Fig. 23, so that the tank is firmly anchored to the foundation. The metal plates 42, of which there are a plurality, are welded to each other and to plates 57 to form the bottom of the tank. It will be noted that the bottom of the tank lies in a single horizontal plane.

Figure 2:
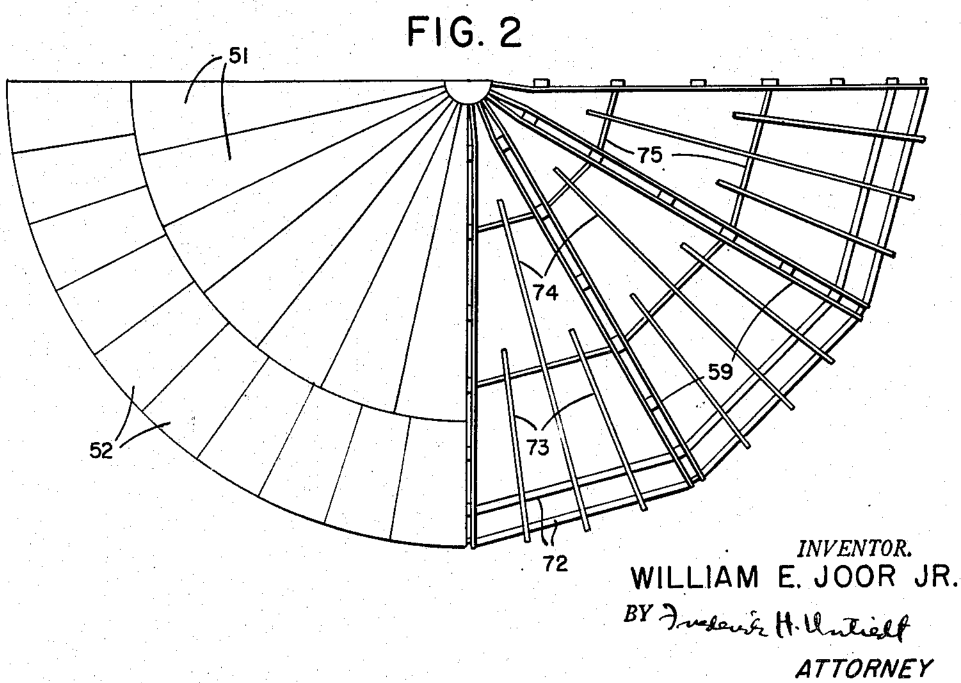
Fig. 2 is a fragmentary plan view, partly in section, of the tank shown in Fig. 1.
Figure 19:
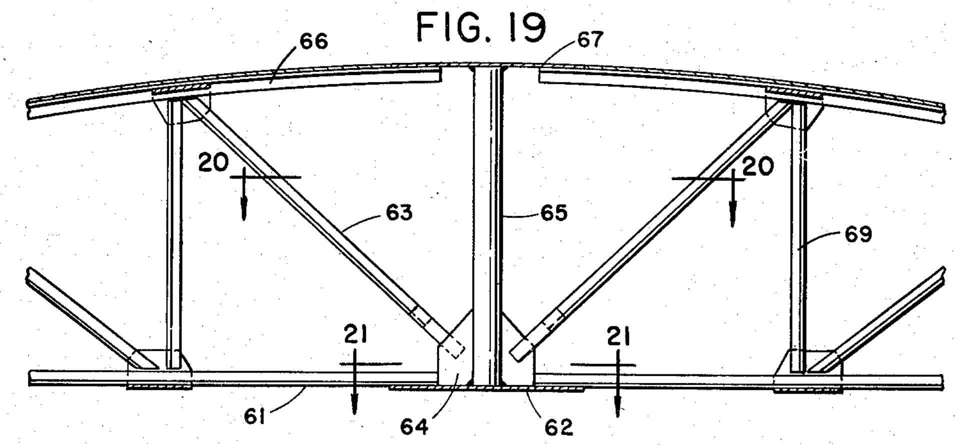
Fig. 19 is a section taken on line 19—19 of Fig. 18.
Figure 20:
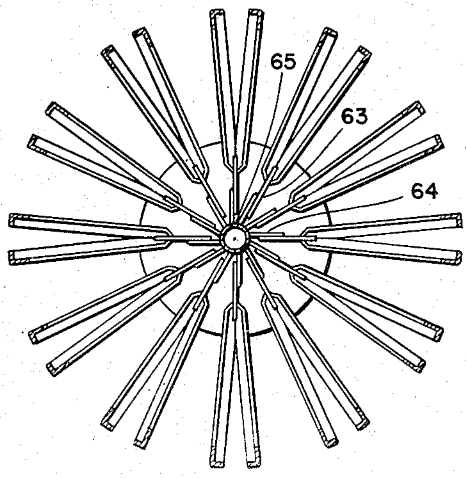
Fig. 20 is a section taken on line 20—20 of Fig. 19.
Figure 21:
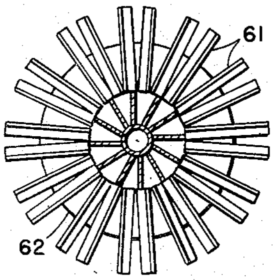
Fig. 21 is a section taken on line 21—21 of Fig. 19.

As shown in Figs. 1 and 2, the tank 40 is provided with frames 59 secured to the foundation 43, certain of the wall and roof plates of the tank being welded to these frames. The purpose of the frames is to restrain inward movement of the walls when the hydrostatic pressure is decreased and to provide adequate support for the roof plates. The frames comprise a number of circumferentially spaced radial trusses, the lower chords 61 of which are secured to a central anchor plate 62 and the diagonals 63 of which are welded to gusset plates 64, the latter being welded to a tubular post 65, as shown in Fig. 19. The upper chords 66 of the frames are also connected by welding them to a circular plate 67 forming the center of the roof, plate 67 also being welded to the segmental plates 51 of the tank and to post 65. It will be seen that the diagonals 63 and the members of the lower chords 61 converge toward the center post and are there welded to the gusset plates, as illustrated in Figs. 20 and 21.

The frames, as shown in Figs. 2 and 28, are each of box form in transverse section, being formed from parallel angle members 68, 68', the former having the curvature of a meridian of the tank and connected by struts 69 and the diagonals 63, the latter also being angle members, all of the angles being welded to plates 71. The lower ends of the frames are welded to the inclined plates 57, and the inner toe of each frame rests on the juncture of bottom plates 42 and inclined plates 57.

Figure 4:
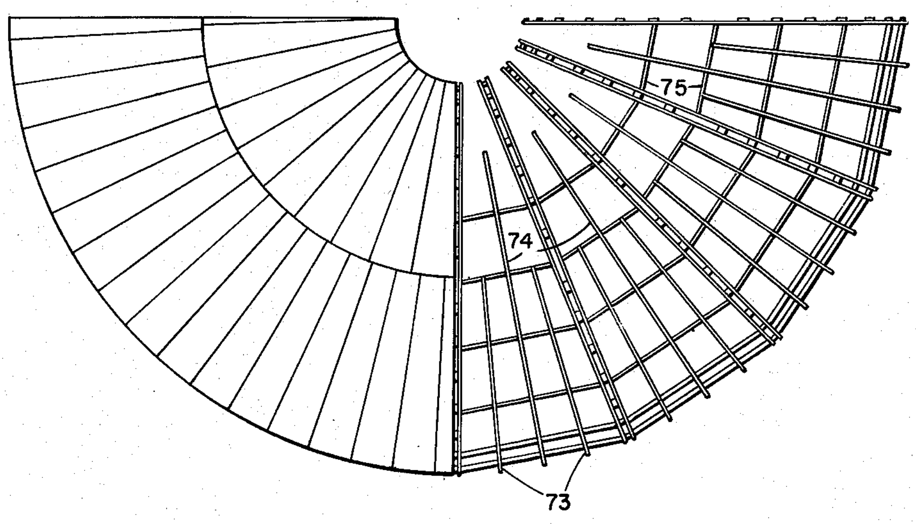
Fig. 4 is a fragmentary plan view, partly in section, of the tank shown in Fig. 3.

The rigid frame structure must be designed to carry the roof loading in a manner typical of such structures when there is no vapor or liquid load in the tank. When the tank is fully loaded, the stresses in the rigid frame structure will be small. When the tank is empty or partially empty of liquid but contains vapors under pressure, the tendency for the wall plates to move inward places lateral forces against the side of each frame adjacent to the wall plates. These forces result in compressive stresses in the upper horizontal portion of each frame at A, A' and bending stresses adjacent the lower end of each frame, which result in a moment about the break line B'—C', they being partially resisted by a compressive or upward reaction at the toe of each frame. By proper design the rigid frame structure can be made to resist the forces due to these various loading conditions in such a manner as to provide a stable vessel under any loading conditions. It may in certain designs be necessary to provide certain joists and stringers running respectively in horizontal planes and meridian planes between the frames of the rigid frame structure to stiffen the walls between the frames. These are shown respectively at 72, 73 in Fig. 2 as channel members. In addition, it will be necessary in the design of certain tanks to provide rafters and joists running respectively in the meridian planes and perpendicular to the meridian planes between the frames to support the roof plates. These are shown at 74, 75 in Figs. 4 and 26 of the drawings.

Study of Equations 1 and 2 in connection with the actual design of a tank of this type indicates that for certain specific conditions of design, i. e., liquid density, vapor pressure, plate thickness, the latter depending on the magnitude of the shell stresses $N\phi$ and $N\theta$ per unit length of element of the shell, etc., the most critical variant is the value of the radius of curvature in the meridian plane, $r_1$. In other words, considering specific shell thicknesses, as the radius $r_1$ is decreased, greater fluid pressures can exist within the vessel. This variant is less affected by the value of $r_0$ than by $r_2$. However, there are practical limitations for specific wall thicknesses beyond which the radius $r_1$ may not be reduced for a vessel shaped as an ideal spheroid of a specific volume. This is true because the curve in the meridian plane would not then pass through the point A, or the overhanging portion of the walls would be too great.

Figure 3:
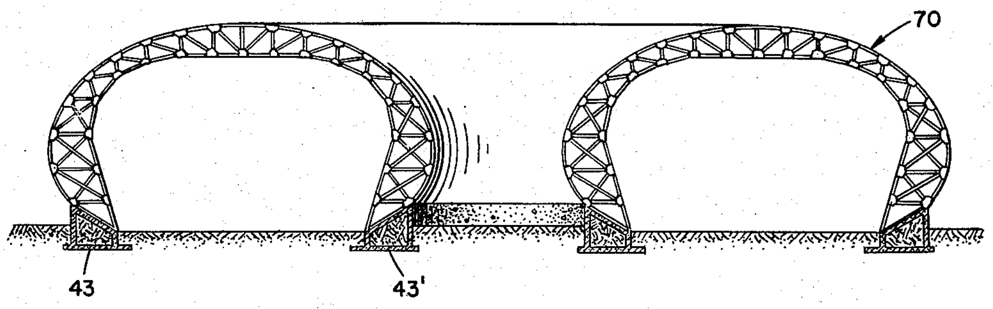
Fig. 3 is a vertical section of a tank in the form of a torus and in which the spheroidal shape illustrated in Fig. 1 is utilized as the surface revolved about the center of the torus.

Study also indicates that if shape of the ideal spheroid is modified so that the point A, Fig. 1, is kept at a point which is relatively at a less height than would be required by the curve in the meridian plane of an ideal spheroid of the same volume, the value of the radius of curvature, $r_1$ may be reduced. This deduction leads to the logical conclusion that a thinner shell may be used in the modified form illustrated in Figs. 3 and 6, if the vessel has the same volume and fluid contents; or that a larger volume may be contained in a shell of the same thickness. Thus it is entirely possible to build a pressure storage tank 70 in the shape of a modified torus with concentric foundations 43, 43', as is shown in Fig. 3, so that a vertical section through one side of the torus is shaped like an ideal spheroid. However, economically, for the storage of most large volumes, it is more practicable to build a tank 80 in the form shown in Fig. 6. In this embodiment, that portion of the roof and walls from A to B' are surfaces of revolution corresponding substantially to a half section of an ideal spheroid. The inner portions of the roof plates are curved downwardly and secured at the point E to the upper edge of a metallic vertical cylindrical center column 76 of large diameter, and the bottom plates are secured at their inner edges, point F, to the lower edge of the center column. The lower end of the center column which rests on the foundation 77 is shown as a reinforced concrete slab which closes the bottom of the cylinder. The ends of the reinforcing rods 78 are welded to the bottom edge of the cylinder at F, and the slab is designed to carry great loads of earth or rock filling. After the cylinder is filled a second concrete slab 79 is poured on top of the filling nearly flush with the top edge of the cylinder, and this slab is covered with a steel plate 81 having a welded connection with the top edges of the cylinder at E. A drainage pipe 98 may be provided to drain off rain water from the depression thus created in the roof.

The weight of the center column including the concrete slabs and the filling is designed to resist the vertical component of the tensile stresses in the roof plates at E, and the steel plate 81 covering the top concrete slab is designed to resist the horizontal component of the stresses in the roof plates at E. These horizontal components act radially outward creating radially acting tensile stresses in the plate covering the top concrete slab. The function of the top concrete slab will be explained later.

Figure 6:
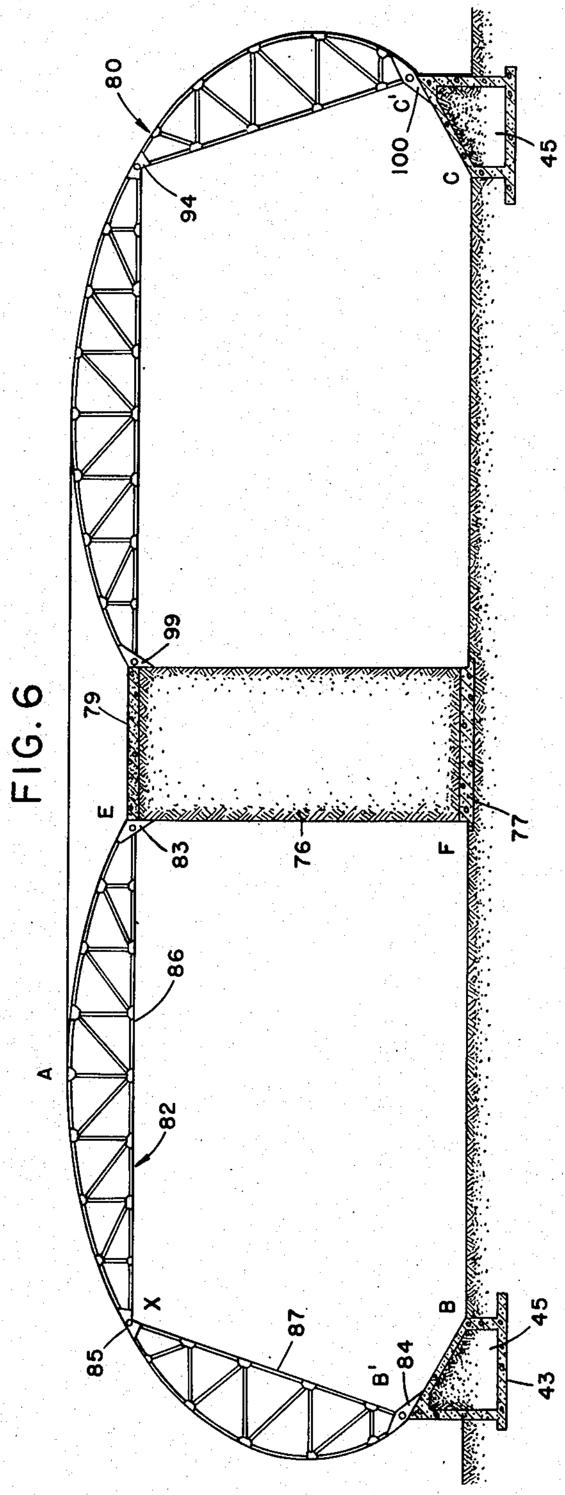
Fig. 6 is a vertical section taken through a further modified form of the invention.

In order to provide structural framing to support the roof loading and to take care of the lateral forces tending to move the walls inward when the liquid level is low and the vapor pressure is tending to cause the walls to become more spherical in shape, a three-hinge-arch structure 82 has been provided within the tank. This is shown in Fig. 6. One hinge 83 of each three-hinge arch is secured to the center column near the point E, another hinge 84 is secured to the bottom and wall plates near the break line B'—C', and the third hinge 85 is at the point X where the curvature of the wall plates and the roof plates merge. These hinges and their approximate location are shown in Fig. 6. A plurality of similar arches extend radially outward from the center column.

Referring to Figs. 9 to 15, it will be seen that each arch consists of an upper horizontal truss 86 and a substantially vertical truss 87, the two trusses being connected to each other at the hinge 85 by means of hinge bolts 88. As is the case in the frame employed in the spheroid type tank, the arches comprise box-shaped members formed by welding parallel angles 89 to other parallel angles 91, 91', disposed at an angle thereto, the angles 91 having the curvature of a meridian of the tank. All of these angles are welded to plates 92, 93. Gusset plates 94 welded to the ends of the trusses form bearings for hinge bolts 88, 95, 96. Diagonals 97 are also connected to the plates 92. Hinges 83 and 84 are connected to plates 99, 100 welded respectively to column 76 and inclined plate 57.

When the tank is empty of liquid and vapor, the roof loading is carried by the horizontal truss 86 of each of the three-hinge arches acting substantially as a truss or beam supported at its inner end by the center column 76 and at its outer end by the other truss 87 of the arch, the latter truss acting substantially as a column. When the tank contains a small volume of liquid and a large volume of vapors under pressure, the truss 87 carries a greater share of the lateral forces acting to move the walls inward. This action causes the truss 87 to act substantially as a truss or beam supported and secured at its lower end B' by the foundation and at the upper end Z by the truss 86 which acts as a column or compression member. The thrust of the truss 86 is toward the center column where it is resisted by the upper concrete slab 79 in the center column. As the thrust action on all the trusses 86 should be equal in the case of symmetrical loading, the structure can be designed as a stable structure. The structure is so designed that points B' and E will be fixed under any conditions of loading. In this form of the invention, as in the case of the ideal spheroid, the bottom plates are flat in the foundation plane because the vertical component of the stress $N\phi$ at E in the roof plates is resisted by the mass of the center column, and only the horizontal component of the stresses $N\phi$ in the wall plates at B is resisted by the tensile stresses in the bottom plates.

As previously stated, the center column shown in Fig. 6 resists the vertical components of the stresses $N\phi$ in the roof plates. These vertical components result in tensile stresses in a vertical direction in the steel cylinder of the center column. The mass of the center column is greater than the summation of all these vertical forces acting upon it, and therefore there will be no vertical forces acting to bend or distort the bottom plates. It is thus possible to employ a bottom consisting of a plurality of welded plates all lying in a single horizontal plane.

However, instead of resisting the vertical components of the roof plates as described, it is possible to make the entire center column of concrete and tie the roof plates to reinforcing rods extending into the center column to resist the stresses in the roof plates. In such case it might be desirable to incase the concrete in metal to prevent oil absorption which would make cleaning the tank difficult.

The center column may, if desired, be relatively light in weight, provided the required heavy mass of concrete is incorporated in the circular slab above or below the roof plates. Such a structure may be mushroom shaped, but would require a large base or foundation.

Figure 5:
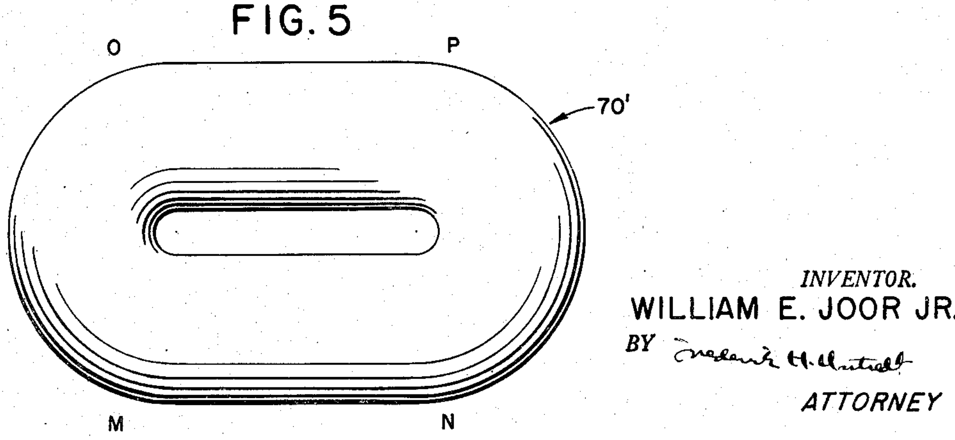
Fig. 5 is a plan view of a modified or elongated torus shaped tank, showing another modification of the invention, it being understood that a vertical section therethrough is similar to that shown in Fig. 3.

It is also possible to build a pressure storage tank 70', the shape of which is not a surface of revolution as shown in Fig. 5. In this embodiment it may be seen that the tank takes the form of an elongated torus, the projected walls of the vessel between the points M—N and O—P being straight. However, the end sections of the shell at each end of the straight section are semi-circular and are surfaces of revolution between the points M and O, and between N and P, each being similar to one-half of the tank shown in Fig. 1.

Figure 8:
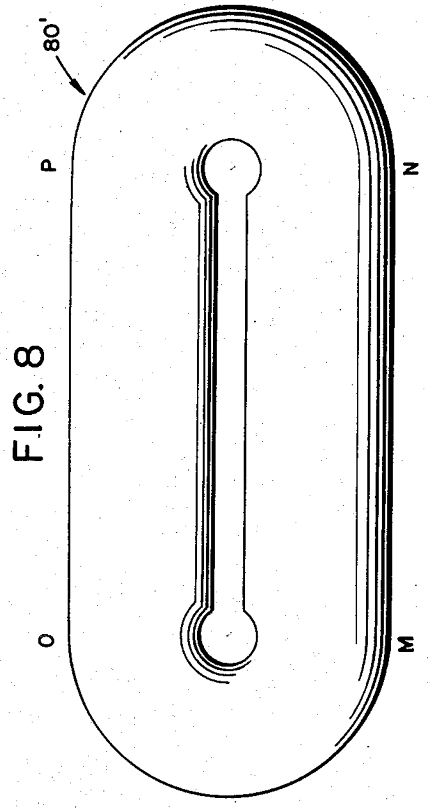
Fig. 8 is a top plan view of a vessel embodying the structure shown in Fig. 6, the vessel being elongated to provide larger storage space.
Figure 7:
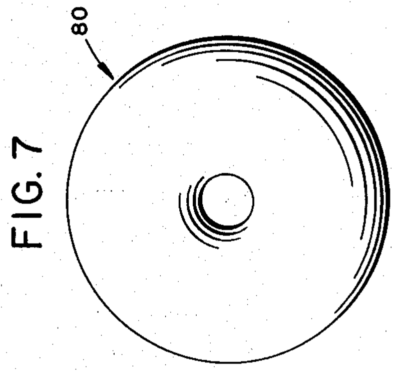
Fig. 7 is a top plan view of the tank shown in Fig. 6.
Figure 9:
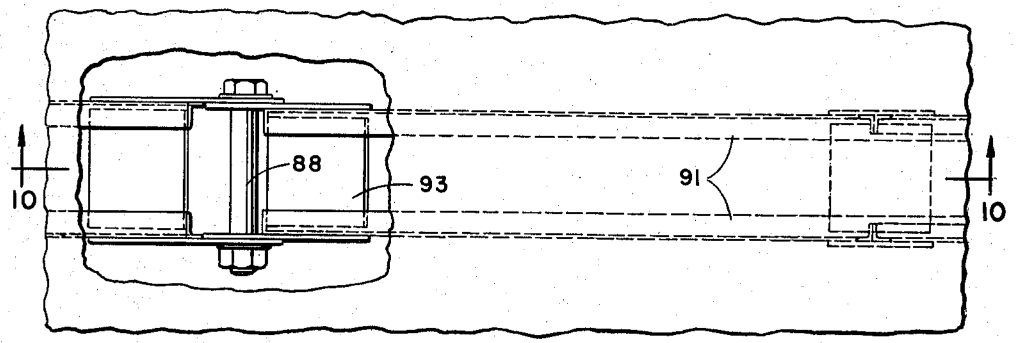
Fig. 9 is a fragmentary plan view, partly in section, of a portion of the arch employed to support the walls and roof of the tank shown in Fig. 6.
Figures 10, 11, 12:
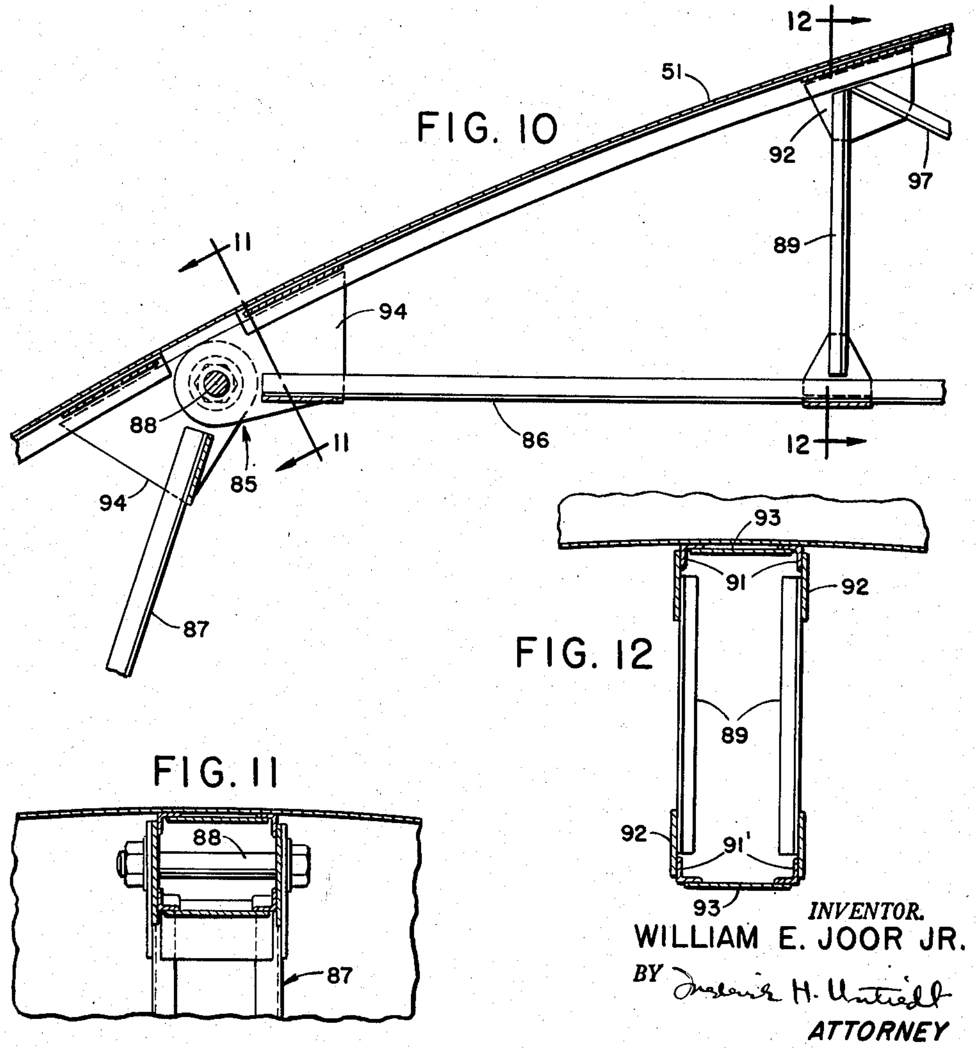
Fig. 10 is a section taken on line 10—10 of Fig. 9.
Fig. 11 is a section taken on line 11—11 of Fig. 10.
Fig. 12 is a section taken on line 12—12 of Fig. 10.
Figure 13:
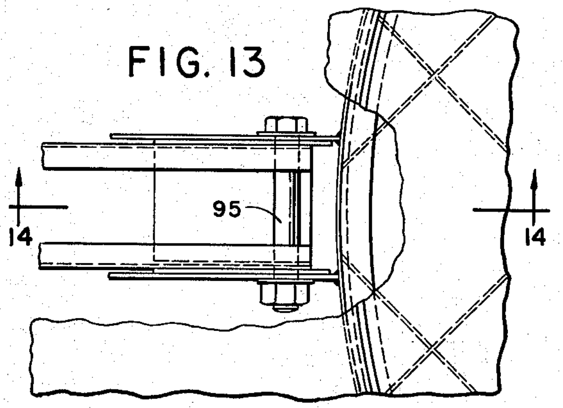
Fig. 13 is a fragmentary plan view, partly in section, of another portion of the arch shown in Fig. 6, together with its connection to the center column of the tank.
Figure 15:
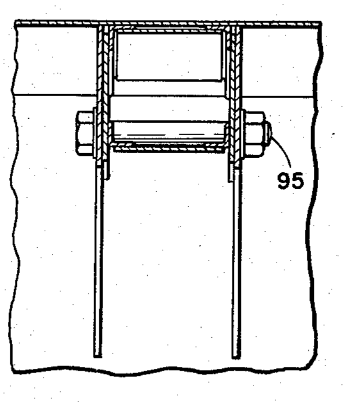
Fig. 15 is a section taken on line 15—15 of Fig. 14.
Figure 14:
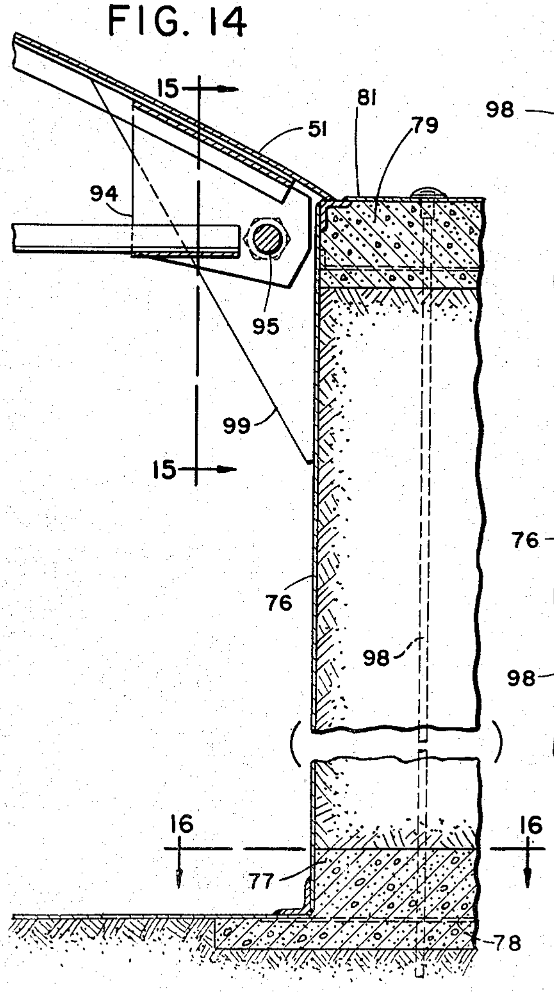
Fig. 14 is a section taken on line 14—14 of Fig. 13.
Figure 16:
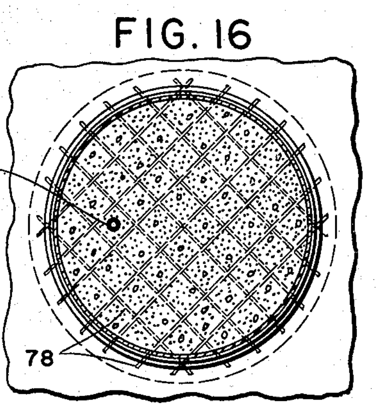
Fig. 16 is a transverse section taken through the center column of the tank shown in Fig. 6 and taken on line 16—16 of Fig. 14.

Another form of elongated tank is shown in Fig. 8, in which each end of the tank 80' is a semi-circular surface of revolution similar to one-half of the tank shown in Fig. 6, the projected connecting sections being straight.

Figure 17:
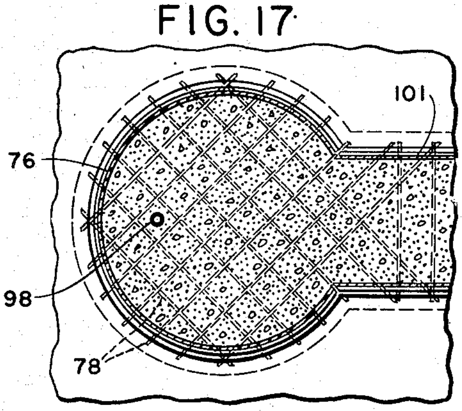
Fig. 17 is a fragmentary section taken through the column employed in the form of the invention illustrated in Fig. 8.
Figure 18:
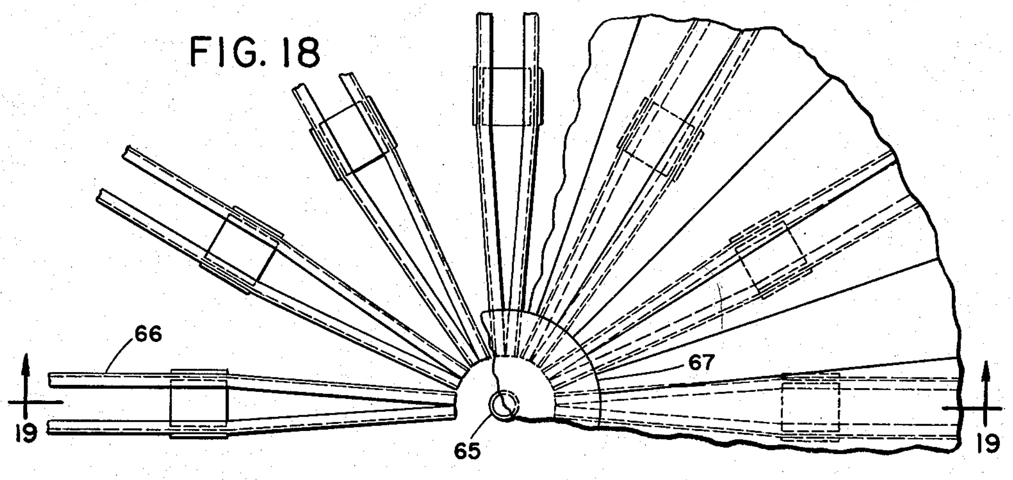
Fig. 18 is a fragmentary top plan view, partly in section, of the center support for meridian trusses employed in the forms of the invention illustrated in Figs. 1 and 2.
Figure 34:
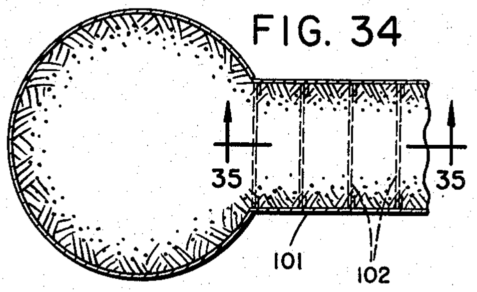
Fig. 34 is a partial transverse section through the center column of a tank such as that shown in Fig. 8.
Figure 35:
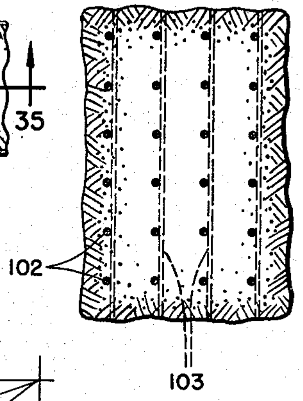
Fig. 35 is a section taken on line 35—35 of Fig. 34.

As shown in Figs. 17, 34, and 35, a transverse section through the center column is shaped somewhat like a dumb-bell, the cylindrical columns 76' supporting the end sections being joined by a straight wall section 101, the width of which is less than the diameter of the cylindrical columns. Reinforcing rods 102, 103 are embedded in the straight portion of the column. The connection portion may, however, have a width equal to the diameter of the cylindrical or semi-cylindrical ends, in which case the tank would have an appearance similar to that of Fig. 5. In this type of tank the outer walls and roof plates in the straight section form a curve in what may be called a transverse meridian plane, of a shape similar to that of the ideal spheroid in the meridian plane. The curve may be determined by using Equation 3 and placing the factor $$\frac{1}{r_2}=0$$

so that Equation 3 becomes $$N\phi\cdot\frac{1}{r_1}=yz \qquad (4)$$

Actually a compromise must be reached between the curve developed by Equations 3 and 4 since the curves are not exactly the same for the specific parameters. The stresses in such a compromised curve may be computed, however, for the various loading conditions and the vessel designed as a stable structure in a manner similar to the ideal and the modified spheriod. This type of tank may be made of any length by simply extending the straight section to the required length and then adding the end closure sections. Consequently there is practically no limit to the volume which may be built in such a vessel.

It is to be understood, of course, that these types of structure could be extended to form a closed square or rectangular vessel, the corner sections of which would be quadrant shaped.

Figure 36:
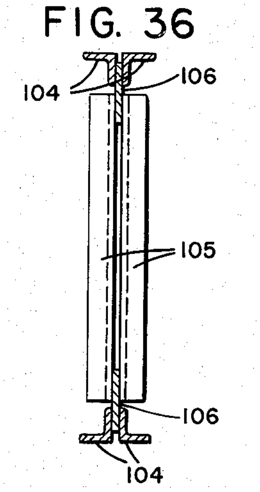
Fig. 36 is a vertical section through a modified form of arch employed in lieu of the box shape arch shown in Fig. 12.

In Fig. 36 is shown a section of a truss member having parallel angles 104, 105 joined by plates 106. This form of truss may be employed in lieu of the box-shaped truss shown in Figs. 12 and 26.

While specific embodiments of the invention have been illustrated and described, it is not intended that the invention be limited to the exact details set forth herein but that changes coming within the purview thereof are contemplated.

Having described my invention, what I claim as new and desire to secure by Letters Patent is:

1. A closed pressure storage tank for storing volatile liquids, at least a substantial portion of which is spheroidal in vertical medidian section, said tank comprising a peripheral concrete foundation and a plurality of roof, wall and bottom plates, a vertical column disposed centrally of the tank, said bottom and said roof being connected to said column, said column including a mass the weight of which is sufficient completely to resist normal upward vertical forces imposed on that portion of the roof adjacent to said column by gases within the tank, thereby to relieve said bottom of said forces, and a plurality of spaced three-hinge trussed arches extending from said column and being normal to said plates, said arches supporting said roof and said side walls, one of the terminal ends of each arch being hinged to said foundation and the other terminal end of each arch being hinged to said column.

2. The combination claimed in claim 1 in which the connected wall and roof plates are so shaped that the stresses in said plates are substantially equal in all directions within the plates under fully loaded conditions.

3. The combination claimed in claim 1 in which the center column comprises a cylindrical metal shell filled with loose material having substantial weight.

4. The combination claimed in claim 1 in which the center column comprises a cylindrical metal shell filled with loose material having substantial weight, and a closure plate of sufficient strength to resist the horizontal components of the stresses in the roof plates is secured to the upper end of the cylindrical shell and to the roof plates.

5. The combination claimed in claim 1 in which the center column comprises a cylindrical metal shell filled with loose material having substantial weight and a reinforced concrete closure of sufficient strength to resist the horizontal components of the stresses in the arches is secured to the upper end of the cylindrical shell and to the roof plates.

6. The combination claimed in claim 1 in which the spaced arches are connected by horizontal beams in vertically spaced relation.

7. A closed pressure storage tank for storing volatile liquids, said tank comprising a peripheral concrete foundation and a plurality of metallic roof, wall and bottom plates, the end portions of said tank being semi-circular in horizontal section, said end portions being connected by spaced parallel straight portions, at least a substantial portion of either end portion and either straight portion of the tank being spheroidal in vertical meridian section, an elongated vertical column disposed centrally of the tank, the sides of said column being parallel to said straight portions and the ends of said column being concentric with respect to said end portions, said column including a mass the weight of which is sufficient completely to resist normal upward vertical forces imposed on that portion of the roof adjacent to said column by gases within the tank, thereby to relieve said bottom of said forces, and a plurality of spaced three-hinge trussed arches extending from said column and being normal to said plates, said arches supporting said roof and said side walls, one of the terminal ends of each arch being hinged to said foundation and the other terminal end of each arch being hinged to said column.

8. A closed pressure storage tank for storing volatile liquids, at least a substantial portion of which is spheroidal in vertical meridian section, said tank comprising a peripheral concrete foundation and a plurality of metallic roof, wall and bottom plates, said foundation having a downwardly and inwardly inclined upper face, metallic plates contiguous to said face and forming part of said foundation, the lowermost of said wall plates being inclined generally in the same direction as said foundation plates, the lower edges of said lowermost plates being welded to the outer edges of said foundation plates, the peripheral edges of the outermost of said bottom plates being welded to the inner peripheral edges of said foundation plates, all of said plates and said foundation being connected to form a fluid-tight closed vessel, a vertical column disposed centrally of the tank, said bottom and said roof being connected to said column, said column including a mass the weight of which is sufficient completely to resist normal upward vertical forces imposed on that portion of the roof adjacent to said column by gases within the tank, thereby to relieve said bottom of said forces, and a plurality of spaced three-hinge trussed arches extending from said column and being normal to said plates, said arches supporting said roof and said side walls, one of the terminal ends of each arch being hinged to said foundation and the other terminal end of each arch being hinged to said column.

WILLIAM EUGENE JOOR, Jr.

REFERENCES CITED

The following references are of record in the file of this patent:

UNITED STATES PATENTS

| Number | Name | Date |
|---|---|---|
| 1,622,787 | Horton | Mar. 29, 1927 |
| 1,670,024 | Day | May 15, 1928 |
| 1,928,640 | Boardman | Oct. 3, 1933 |
| 2,045,478 | Kuehn | June 23, 1936 |
| 2,201,652 | Joor | May 21, 1940 |
| 2,250,250 | Brooks | July 22, 1941 |
| 2,289,913 | Joor | July 14, 1942 |
| 2,297,002 | Larson | Sept. 29, 1942 |
| 2,380,089 | Ulm | July 10, 1945 |
| 2,417,053 | Boardman | Mar. 11, 1947 |